No. 654,408. Patented July 24, 1900.
A. B. MACKLIN.
HYDROCARBON INCANDESCENT LAMP.
(Application filed Mar. 9, 1900.)
(No Model.) 2 Sheets—Sheet 1.

Witnesses.
J. Green
M. Wheddon.

Inventor.
Athol B. Macklin
By
attys.

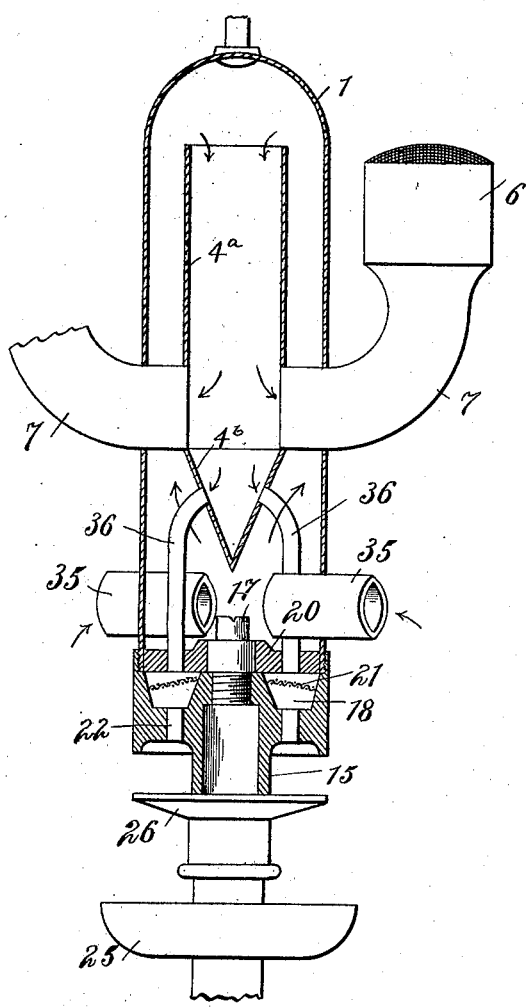

UNITED STATES PATENT OFFICE.

ATHOL B. MACKLIN, OF NEW YORK, N. Y.

HYDROCARBON INCANDESCENT LAMP.

SPECIFICATION forming part of Letters Patent No. 654,408, dated July 24, 1900.

Application filed March 9, 1900. Serial No. 7,988. (No model.)

*To all whom it may concern:*

Be it known that I, ATHOL B. MACKLIN, a subject of the Queen of Great Britain, residing at New York, in the county and State of New York, have invented certain new and useful Improvements in Hydrocarbon Incandescent Lamps, of which the following specification, taken in connection with the accompanying drawings, is a full, clear, and exact description.

The object of my invention is to provide a simple, self-contained, and effective lamp which will vaporize a hydrocarbon oil, mix the vapor with a proper quantity of air to produce an inflammable gas, and supply the gas to incandescent burners for producing light of a high candle-power and to an auxiliary burner for heating the vaporizer.

My invention comprises, essentially, a suitable mixing-chamber formed of an outer bell-shaped section and an inner tubular section and having air and gas supplies communicating with suitable vapor-burners, the vaporizing-chamber supporting the mixing-chamber and having a suitable fluid-supply and a vapor-discharge nozzle directed toward the supply-opening of the mixing-chamber, and an auxiliary burner mounted upon and surrounding the vaporizing-chamber and having gas communication with the mixing-chamber, whereby the vaporizer will be kept heated after the generation of vapor in the vaporizing-chamber has been started and the lamp has been lighted. The inner tubular section of the mixing-chamber is adjustable toward and away from the vaporizing-chamber to regulate the supply of air which is drawn in and mixed with the vapor issuing from the vapor-nozzle in the mixing-chamber.

Figure 1:
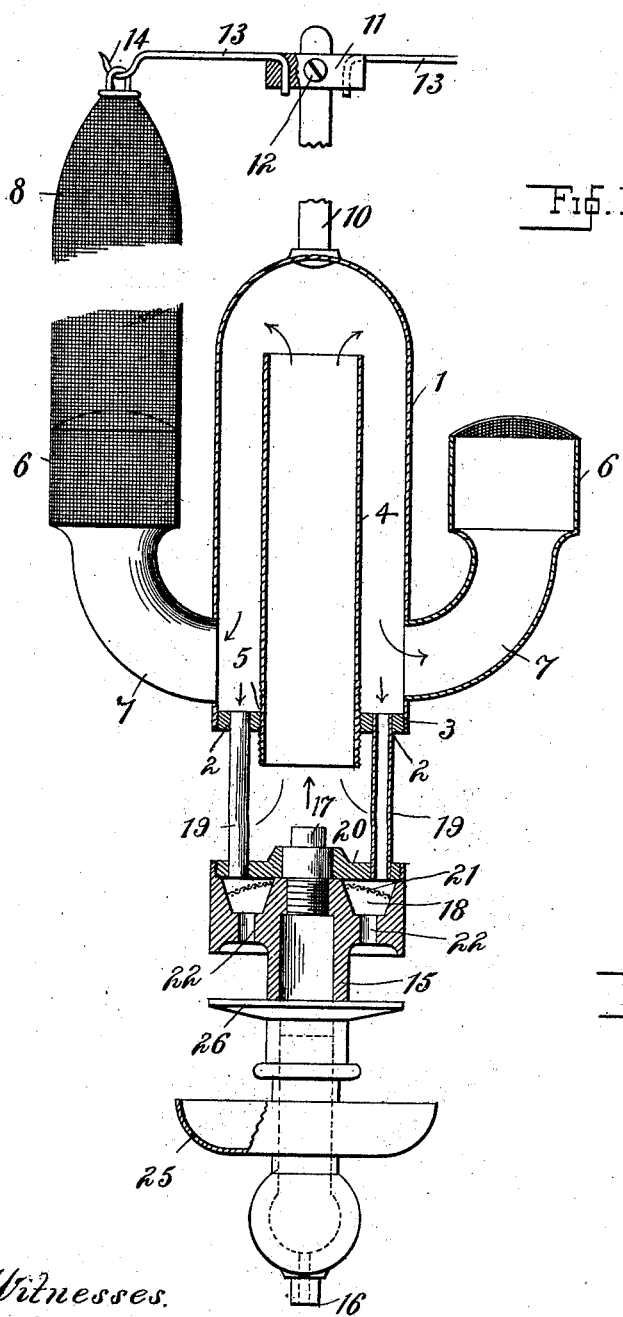
Figure 2:
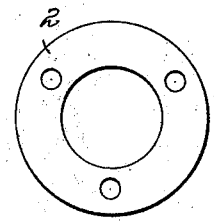
Figure 3:
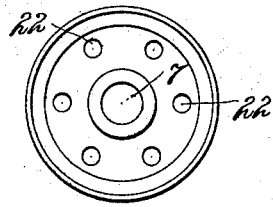

In the following drawings, Figure 1 is a vertical sectional elevation of one form of my improved hydrocarbon incandescent lamp. Figs. 2 and 3 are detail plan views of parts of the same. Fig. 4 is a sectional elevation of a modified form of lamp embodying my invention. Fig. 5 is a sectional elevation of the lower portion of the form of lamp shown in Fig. 4.

In Fig. 1 the mixing-chamber comprises a bell-shaped outer casing 1, having an annular plate 2 threaded into its lower end 3 and a tube 4 extending up into the bell 1 and threaded into the central opening 5 of the plate 2. The tube 4 is vertically adjustable in its support 2 by reason of its threaded connection therewith for the purpose hereinafter explained.

6 6 are vapor-burners at the terminals of the gas-supply tubes 7, leading from the mixing-chamber 1.

8 indicates an ordinary incandescent mantle, such as now commonly employed with gas-lamps. The mantle 8 may be supported in any suitable way above the vapor-burner. I have represented a lamp with two burners and an adjustable mantle-support for supporting the mantles in proper position above all of the burners.

10 is a rod or bar extending up from the crown of the bell-shaped casing 1, and 11 is a bracket mounted upon the rod 10 and held in any desired adjusted position thereon by means of a set-screw 12.

13 13 represent mantle-supporting wires, which are suitably mounted in the adjustable bracket 11 and formed with hooks 14, upon which the incandescent mantles are mounted.

15 is the vaporizing-chamber, having an oil-supply pipe 16. The vaporizing-chamber 15 is located beneath the mixing-chamber and is provided at its upper end with a vapor-blast nozzle 17, which directs the blast-vapor vertically into the central tube or pipe 4 of the mixing-chamber.

Surrounding the upper end of the vaporizing-chamber 15 is an annular auxiliary-burner chamber 18, which connects with the outer space of the mixing-chamber through a plurality of vertical gas-supply tubes 19, which are set into the bottom plate 2 of the mixing-chamber and the top plate 20 of the auxiliary-burner chamber. The plate 20 is suitably threaded into the burner-chamber and surrounds the vaporizing-nozzle 17. 21 is a ring of wire-gauze mounted in the burner-chamber 18.

22 represents openings leading to the auxiliary-burner chamber from the outer air for supplying the flame of the burner with air.

Surrouding the vaporizing-chamber at its lower end is a cup 25 to receive a suitable quantity of alcohol or other inflammable liquid, which is ignited to get up the proper initial heat in the vaporizer to effect the vaporization of the oil in starting the operation of the lamp.

26 is an annular flange surrounding the vaporizing-chamber beneath the auxiliary-burner chamber 18 to prevent the disturbance of the flame in the auxiliary-burner chamber by any violent currents of air.

When the vaporizing-chamber has become sufficiently heated to vaporize the hydrocarbon oil, the vapor will issue at the nozzle 17 and the pressure within the vaporizing-chamber will force the vapor up into the tube 4 of the mixing-chamber, drawing with it a sufficient charge of air. The vapor and air passing up through the tube 4 is deflected by the bell-shaped top of the outer casing of the mixing-chamber and passes downwardly to the bottom of the mixing-chamber and thence to the burners. Some of the mixed vapor and air passes through the auxiliary tubes 19 to the auxiliary-burner chamber 18, and as this inflammable mixture issues through the wire, gauze 21 it will be ignited by the flame from the alcohol in cup 25, passing up through the openings 22. The auxiliary burner will thereafter maintain the vaporizing-chamber at the proper temperature to continue vaporizing the hydrocarbon oil which is supplied to the vaporizing-chamber. The air passes to the mixing-chamber through the open lower end of the tube 4 from the open space between the vaporizer and mixing-chamber. By adjusting the tube 4 vertically in its supporting-plate 2 the quantity of air supplied can be regulated, as the opening for the admission of the air is increased or decreased by the adjustment.

If preferred, the alcohol-cup 25 may be dispensed with and the initial heat for starting the vaporizing operation be supplied in any other desirable way—such, for instance, as a blow-torch or a gas Bunsen.

In Figs. 4 and 5 I have illustrated a slightly-modified form of vapor-lamp constructed in accordance with my invention. In this lamp the vaporizing-chamber and its surrounding auxiliary burner for maintaining it at the proper temperature are substantially the same as in the form illustrated in Fig. 1. In this latter form, however, I have represented the use of a needle-valve for controlling the flow of vapor from the vaporizing-chamber. The nozzle 17 is formed with a seat $17^a$ for a needle-valve 30, which is mounted upon the threaded valve-stem 31, which passes through the packing-box 32, mounted upon the lower end of the vaporizing-chamber. 33 is an oil-supply pipe passing into the vaporizing-chamber through one side. In this latter form of lamp the outer bell 1 of the mixing-chamber is attached directly to the upper end of the vaporizing-chamber, and the inner tube $4^a$ is closed at its bottom by a conical part $4^b$. The vapor issuing from the nozzle 17 impinges upon the conical end of the inner tube $4^a$ and is deflected outwardly and upwardly against the bell 1. 35 35 represent air-supply tubes leading through the side walls of bell 1, through which tubes the blast of vapor from nozzle 17 draws the charge of air for mixing with the vapor. The vapor and air pass up around the tube $4^a$ and are deflected by the dome of the bell 1 and are caused to pass downward into the inner mixing-chamber $4^a$. The burner-tubes 7 lead from the inner tube $4^a$ to the burners 6. 36 36 represent auxiliary gas-supply tubes leading from the conical lower end of tube $4^a$ of the mixing-chamber to the auxiliary-burner chamber 18 for supplying gas thereto substantially the same as in the form of lamp illustrated in Fig. 1.

I claim—

1. In a hydrocarbon-lamp, the combination of a vaporizing-chamber having a fluid-supply and a vapor-discharge nozzle, a mixing-chamber comprising an outer bell-shaped section supported upon the vaporizing-chamber with an air-supply space between them and an inner tubular section adjustably mounted within the outer bell-shaped section and capable of being adjusted toward and away from the vaporizing-chamber to regulate the size of the air-supply space, and burners communicating with the outer section of the mixing-chamber, substantially as set forth.

2. In a hydrocarbon-lamp, the combination of a vaporizing-chamber having a fluid-supply and a vapor-discharge nozzle, a vaporizer-heating burner supported upon and surrounding the vaporizing-chamber, a mixing-chamber comprising an outer bell-shaped section closed at the bottom by an annular plate such as 2 and an inner tubular section threaded into said annular plate and adjustably supported thereby within the outer section, the tubular supports mounted upon the vaporizing-chamber and supporting the mixing-chamber, said tubular supports affording communication between the mixing-chamber and the vaporizer-heating burner, and burners communicating with the mixing-chamber, said inner tubular section of the mixing-chamber being adjustable in its supporting-plate toward and away from the vaporizing-chamber, substantially as and for the purpose set forth.

ATHOL B. MACKLIN.

Witnesses:
J. GREEN,
WM. E. KNIGHT.